(12) United States Patent
Wang et al.

(10) Patent No.: US 12,132,341 B2
(45) Date of Patent: Oct. 29, 2024

(54) BATTERY CHARGING AND DISCHARGING CIRCUIT

(71) Applicant: FranklinWH Technologies Co., Ltd., Guangdong (CN)

(72) Inventors: Daqing Wang, Guangdong (CN); Yuezhen Hu, Guangdong (CN); Haisheng Song, Guangdong (CN)

(73) Assignee: FranklinWH Technologies Co., Ltd., Shenzhen (CN)

( * ) Notice: Subject to any disclaimer, the term of this patent is extended or adjusted under 35 U.S.C. 154(b) by 530 days.

(21) Appl. No.: 17/560,243

(22) Filed: Dec. 22, 2021

(65) Prior Publication Data
US 2022/0115887 A1    Apr. 14, 2022

Related U.S. Application Data

(63) Continuation of application No. PCT/CN2021/101556, filed on Jun. 22, 2021.

(30) Foreign Application Priority Data

Jun. 22, 2020  (CN) .......................... 202010574580.0

(51) Int. Cl.
*H02J 7/00* (2006.01)
*H02J 3/32* (2006.01)
(Continued)

(52) U.S. Cl.
CPC .............. *H02J 7/0068* (2013.01); *H02J 3/32* (2013.01); *H02J 7/06* (2013.01); *H02M 1/007* (2021.05);
(Continued)

(58) Field of Classification Search
CPC .... H02J 7/0068; H02J 3/32; H02J 7/06; H02J 2207/20; H02J 9/062; H02M 1/007;
(Continued)

(56) References Cited

U.S. PATENT DOCUMENTS

| | | | |
|---|---|---|---|
| 2007/0159858 A1* | 7/2007 | Spindler | H02J 3/32 363/37 |
| 2016/0241137 A1* | 8/2016 | Sun | H02J 5/00 |
| 2017/0229972 A1* | 8/2017 | Cerqueira Pinto Bezerra Varajão | H02M 7/797 |
| 2018/0109123 A1* | 4/2018 | Kaufmann | H01M 8/188 |

(Continued)

FOREIGN PATENT DOCUMENTS

| CN | 102361101 A | 2/2012 |
|---|---|---|
| CN | 102437628 A | 5/2012 |

(Continued)

*Primary Examiner* — Stacy Whitmore

(57) ABSTRACT

The embodiment of the invention discloses a battery charging and discharging circuit, comprising: a battery module (1), configured to receive charging voltage or release discharging voltage; a transformer circuit (2), connected with the battery module (1), the transformer circuit (2) is configured to convert a first charging voltage into a charging voltage or convert a discharging voltage into a first discharging voltage; a buck-boost circuit (3), connected with the transformer circuit (2), the buck-boost circuit (3) is configured to convert a second charging voltage into the first charging voltage or convert the first discharging voltage into a second discharging voltage; a power grid end or user end (4), connected with the buck-boost circuit (3), the power grid end or user end (4) is configured to generate the second charging voltage or receive the second discharging voltage.

8 Claims, 3 Drawing Sheets

(51) Int. Cl.
    *H02J 7/06*     (2006.01)
    *H02M 1/00*     (2007.01)
    *H02M 3/158*     (2006.01)
    *H02M 3/335*     (2006.01)
    *H02M 7/5387*     (2007.01)

(52) U.S. Cl.
    CPC ..... *H02M 3/1582* (2013.01); *H02M 3/33573* (2021.05); *H02M 7/53871* (2013.01); *H02J 2207/20* (2020.01)

(58) Field of Classification Search
    CPC ........... H02M 3/1582; H02M 3/33573; H02M 7/53871; H02M 3/01; H02M 7/487; H02M 7/4807; H02M 3/158; H02M 3/3353
    See application file for complete search history.

(56) References Cited

U.S. PATENT DOCUMENTS

| | | | | |
|---|---|---|---|---|
| 2018/0337532 A1* | 11/2018 | Abu Qahouq | ............ | H02J 3/06 |
| 2019/0181760 A1* | 6/2019 | Choi | ................... | H02M 3/1582 |
| 2021/0155104 A1* | 5/2021 | Skutt | ....................... | B60L 58/12 |
| 2022/0103060 A1* | 3/2022 | Chapman | ................ | H02M 7/44 |

FOREIGN PATENT DOCUMENTS

| | | | | |
|---|---|---|---|---|
| CN | 102751772 A | | 10/2012 | |
| CN | 103187785 A | | 7/2013 | |
| CN | 204615655 U | | 9/2015 | |
| CN | 106505859 A | | 3/2017 | |
| CN | 106685039 A | | 5/2017 | |
| CN | 106972604 A | | 7/2017 | |
| EP | 2498370 A1 * | | 9/2012 | ................ H02J 7/00 |
| JP | 2013162652 A | | 8/2013 | |

* cited by examiner

BATTERY CHARGING AND DISCHARGING CIRCUIT

CROSS REFERENCE TO RELATED APPLICATIONS

The present application is a Continuation Application of PCT Application No. PCT/CN2021/101556 filed on Jun. 22, 2021, which claims the priority of Chinese patent application No. 202010574580.0, filed with China Patent Office on Jun. 22, 2020, and the contents of which are incorporated herein by reference in their entirety.

TECHNICAL FIELD

The embodiments of the present application relate to battery charging and discharging technology, for example, a battery charging and discharging circuit.

BACKGROUND

Energy storage system includes a battery and a bidirectional Direct current/Alternating current (DC/AC) energy storage inverter. The battery has low voltage and high voltage. The DC/AC energy storage inverter is configured to convert the direct current of the battery into alternating current to power the load, or for grid connection to the public power grid. The output AC voltage and current of inverter must have low harmonic content. In related industries, the above battery and DC/AC energy storage inverter are generally placed separately. The battery is hung on the wall or placed on the ground. The whole system occupies a large area of resources and has many external connections. Moreover, because the battery and inverter are produced by different manufacturers, they must be paired and communicate with each other to be used as a whole. Especially when multiple sets of energy storage systems are connected in parallel, more resources would be occupied. And the shape of the battery and the inverter are not matched, which is not matched in home use. Function of energy storage system: when there is mains power, the battery is charged by DC/AC energy storage inverter, and the charging current is determined by the communication between Battery Management System (BMS) and inverter. In case of power failure, the battery supplies power to important loads through DC/AC energy storage inverter. In related industries, in the event of power failure, the DC/AC energy storage inverter would restart, and then the battery would be converted into alternating current to supply power to the load. There would be a power failure of more than seconds during this process, and important equipments cannot save data. In some high-voltage energy storage systems, because the inverter is not isolated, there are potential safety hazards and it is inconvenient for home users to use.

SUMMARY

The application provides a battery charging and discharging circuit, aiming to achieve the effect of uninterrupted charging and discharging.

In a first aspect, an embodiment of the present application provides a battery charging and discharging circuit, including:
- a battery module (1), configured to receive charging voltage or release discharging voltage;
- a transformer circuit (2), connected with the battery module (1), the transformer circuit (2) is configured to convert a first charging voltage into a charging voltage or convert a discharging voltage into a first discharging voltage;
- a buck-boost circuit (3), connected with the transformer circuit (2), the buck-boost circuit (3) is configured to convert a second charging voltage into the first charging voltage or convert the first discharging voltage into a second discharging voltage;
- a power grid end or user end (4), connected with the buck-boost circuit (3), the power grid end or user end (4) is configured to generate the second charging voltage or receive the second discharging voltage.

DETAILED DESCRIPTION OF DISCLOSED EMBODIMENTS

Figure 1:
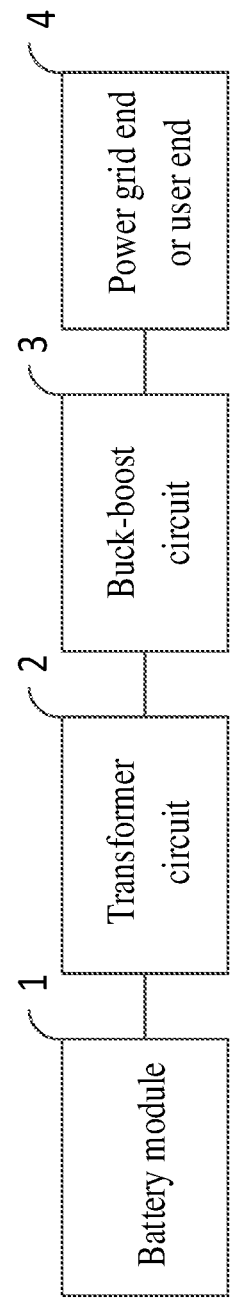
FIG. 1 is a module connection diagram of a battery charging and discharging circuit provided by Embodiment 1 of the present application.

Before discussing the exemplary embodiments in more detail, it should be note that some exemplary embodiments are described as processes or methods depicted as flowcharts. Although the flowchart describes the steps as sequential processing, many of them may be implemented in parallel, concurrently or simultaneously. In addition, the order of steps may be rearranged. The processing may be terminated when the operation is completed, but there may be additional steps not included in the drawings. The processing may correspond to methods, functions, procedures, subroutines, etc.

Further, that term "first," "second," and the like may be used herein to describe various direction, actions, steps, or elements, etc., but those direction, actions, steps, or elements are not limited by these terms. These terms are only used to distinguish the first direction, action, step or element from another direction, action, step or element. For example, without departing from the scope of this application, the first voltage may be referred to as the second voltage, and similarly, the second voltage may be referred to as the first voltage. The first voltage and the second voltage are both voltage, but they are not the same voltage. The terms "first", "second" and so on cannot be understood as indicating or implying relative importance or implicitly indicating the number of the technical features. Thus, the features defined by "first" and "second" may explicitly or implicitly include one or more of the features. In the description of the embodiments of the present application, "a plurality of" means at least two, such as two, three, etc., unless otherwise explicitly defined. And the singular terms "a", "an" and "the" include plural reference and vice versa unless the context clearly indicates otherwise.

Embodiment 1

FIG. 1 is a module connection diagram of a battery charging and discharging circuit provided by Embodiment 1 of the present application, which is suitable for uninterrupted charging and discharging of batteries. It includes a battery module 1, a transformer circuit 2, a buck-boost circuit 3 and a power grid end or user end 4.

Figure 2:
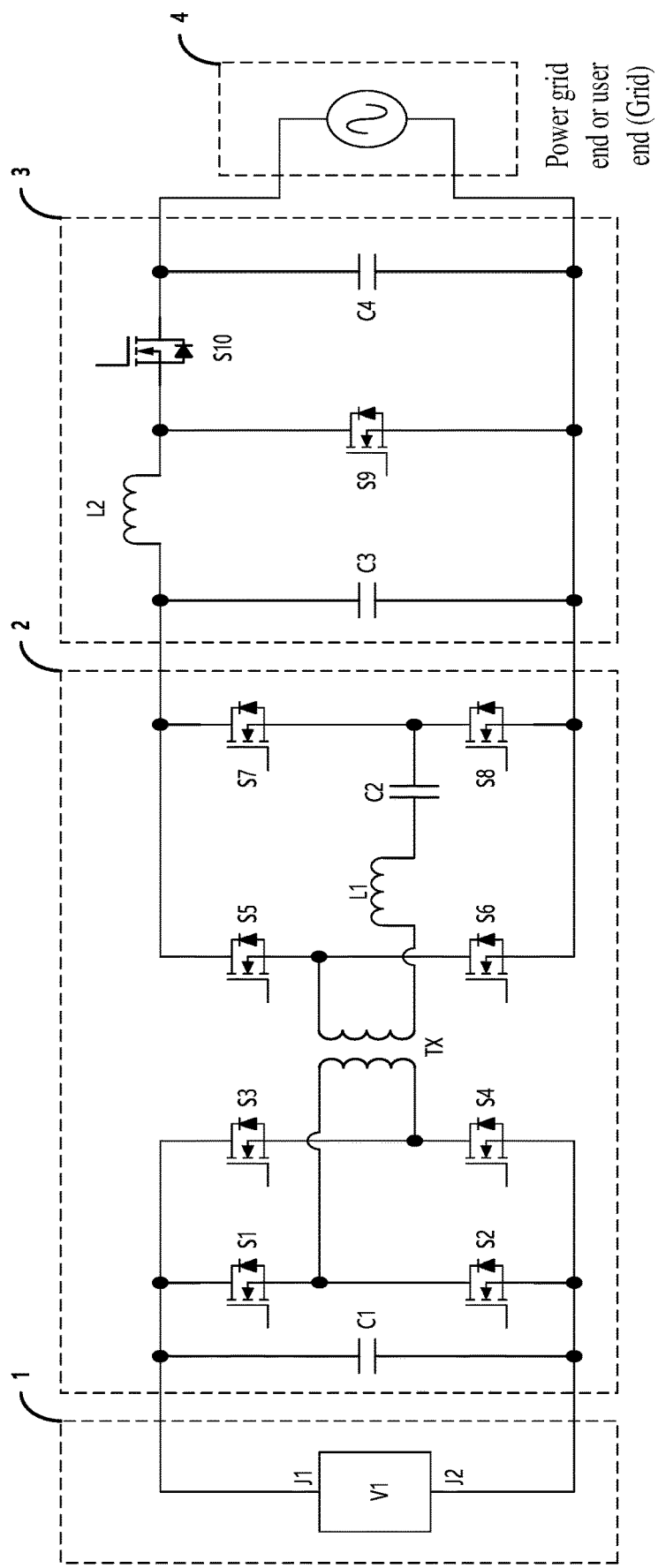
FIG. 2 is a circuit diagram of a battery charging and discharging circuit provided by Embodiment 1 of the present application.

Exemplarily, referring to FIG. 2, a circuit diagram of a battery charging and discharging circuit provided by this embodiment. The battery module 1 is configured to receive charging voltage or release discharging voltage. The battery module 1 includes a battery V1, the battery V1 includes a first interface J1 and a second interface J2.

In this embodiment, the battery V1 is a lithium battery, which is a kind of battery with lithium metal or lithium alloy as positive/negative electrode material and a non-aqueous electrolyte solution, and has the effect of charging and discharging. The charging voltage and discharging voltage of the battery V1 are both 48V, and the output voltage and charging voltage of the battery V1 may be adaptively adjusted according to the model of battery V1, which is not limited in this embodiment. If interface J1 is the positive electrode of battery V1, then interface J2 is the negative electrode; and if interface J1 is the negative electrode of battery V1, then interface J2 is the positive electrode. The above is not limited in this embodiment.

The transformer circuit 2 is connected with the battery module 1, and configured to convert a first charging voltage into a charging voltage or convert a discharging voltage into a first discharging voltage; The transformer circuit 2 includes a transistor S1, a transistor S2, a transistor S3, a transistor S4, a transistor S5, a transistor S6, a transistor S7, a transistor S8, a transformer TX, an inductor L1, a capacitor C1 and a capacitor C2.

A first end of the capacitor C1 is connected to the battery module 1;
  a second end of the capacitor C1 is connected to the battery module 1;
  a first end of the transistor S1 is connected to the first end of the capacitor C1;
  a second end of the transistor S1 is connected to the first end of the transistor S2;
  a second end of the transistor S2 is connected to the second end of the capacitor C1;
  a first end of the transistor S3 is connected to the first end of the transistor S1;
  a second end of the transistor S3 is connected to a first end of the transistor S4;
  a second end of the transistor S4 is connected to the second end of the transistor S2;
  a first end of the transistor S5 is connected to a first end of the transistor S7;
  a second end of the transistor S5 is connected to a first end of the transistor S6;
  a second end of the transistor S6 is connected to a second end of the transistor S8;
  a second end of the transistor S7 is connected to a first end of the transistor S8;
  a first end of a primary side of the transformer TX is connected to the second end of the transistor S1;
  a second end of the primary side of the transformer TX is connected to the first end of the transistor S4;
  a first end of a secondary side of the transformer TX is connected to the second end of the transistor S5;
  a second end of the secondary side of the transformer TX is connected to a first end of the inductor L1;
  a second end of the inductor L1 is connected to a first end of the capacitor C2; and
  a second end of the capacitor C2 is connected to the second end of the transistor S7.

In this embodiment, the transformer circuit 2 is a bidirectional full-bridge resonant conversion circuit, which includes a full-bridge circuit with transistors S1, S2, S3 and S4, a high-frequency transformer TX, and a full-bridge circuit with transistors S5, S6, S7 and S8 on the secondary side. The high-frequency transformer TX realizes high-low voltage conversion. The first charging voltage and first discharging voltage are 300V. The charging voltage or discharging voltage of the battery V1 is increased to 300V by the full-bridge resonant conversion circuit. The transistors S1, S2, S3 and S4 are fixed at 50% duty cycle, so that Zero-Voltage-Switching can be realized with small excitation current and to ensure that the transformer is not saturated. The secondary side is rectified and output to 300 V through diodes in transistors S5-S8.

The buck-boost circuit 3 is connected with the transformer circuit 2, and configured to convert a second charging voltage into the first charging voltage or convert the first discharging voltage into a second discharging voltage. The buck-boost circuit 3 includes: an inductor L2, a transistor S9, a transistor S10, a capacitor C3 and a capacitor C4.

A first end of the capacitor C3 is connected to a first end of the transformer circuit 2;
  a second end of the capacitor C3 is connected to a second end of the transformer circuit 2;
  a first end of the inductor L2 is connected to the first end of the capacitor C3;
  a second end of the inductor L2 is connected to a first end of the transistor S9;
  a second end of the transistor S9 is connected to the second end of the capacitor C3;
  a first end of the transistor S10 is connected to the second end of the inductor L2;
  a second end of the transistor S10 is connected to a first end of the capacitor C4; and
  a second end of the capacitor C4 is connected to the second end of the transistor S9.

In this embodiment, the buck-boost circuit 3 is a bidirectional BUCK/BOOST circuit. BUCK circuit refers to the single-tube uninsulated DC conversion whose output voltage is less than the input voltage, and BOOST circuit refers to the single-tube uninsulated DC conversion whose output voltage is higher than the input voltage. The second charging voltage and second discharging voltage are 360V, and the second charging voltage of 360V is changed into the first charging voltage of the transformer circuit 2 through the BUCK circuit composed of the inductor L2, and the diodes in the transistor S9 and transistor S10. The first discharge voltage of the transformer circuit 2 is changed into the second discharge voltage of 360V through the BOOST circuit composed of the inductor L2, and the diodes in the transistor S9 and transistor S10.

A power grid end or user end 4 is connected with the buck-boost circuit 3. And the power grid end or user end 4 is configured to generate the second charging voltage or receive the second discharging voltage.

In this embodiment, the second charging voltage is generated by the power grid end. When the power grid end supplies power normally, the battery V1 is in the charging mode, and the second charging voltage (360V) at the power grid end is decreased to the first charging voltage (300V) through the buck-boost circuit 3, then further decreased to the charging voltage (48V) through the transformer circuit 2, and then input to the battery V1 for charging. The discharge voltage is generated by the battery V1. When the power grid end can't supply power, the battery V1 is in the discharge mode. The discharge voltage (48V) is increased to the first discharge voltage (300V) through the transformer circuit 2, and then increased to the second discharge voltage (360V) through the buck-boost circuit 3, and then input to the user end for use.

The embodiment of the present application discloses a battery charging and discharging circuit, including: a battery module, configured to receive charging voltage or release discharging voltage; a transformer circuit 2, connected with the battery module 1, the transformer circuit 2 is configured to convert a first charging voltage into a charging voltage or convert a discharging voltage into a first discharging voltage; a buck-boost circuit 3, connected with the transformer circuit 2, the buck-boost circuit 3 is configured to convert a second charging voltage into the first charging voltage or convert the first discharging voltage into a second discharging voltage; a power grid end or user end 4, connected with the buck-boost circuit 3, the power grid end or user end 4 is configured to generate the second charging voltage or receive the second discharging voltage. According to the battery charging and discharging circuit provided by the embodiment of the present application, the battery is charged when there is commercial power at the power grid end, and the battery supplies power to important loads at the user end when the power grid end is cut off, so that the effect of uninterrupted charging and discharging is achieved, and the electricity safety of users is realized.

Embodiment 2

Figure 3:
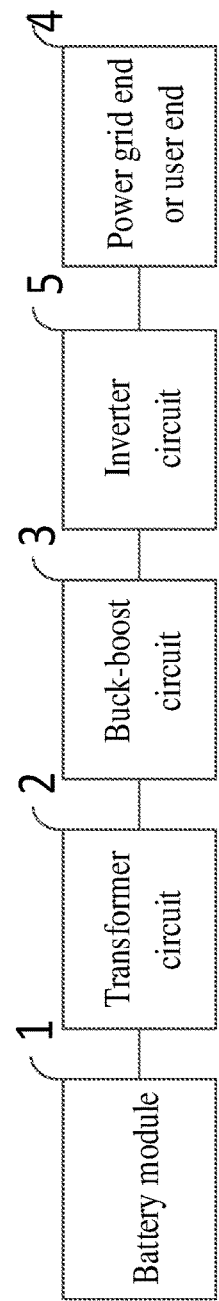
FIG. 3 is a module connection diagram of a battery charging and discharging circuit provided by Embodiment 2 of the present application.

FIG. 3 is a module connection diagram of a battery charging and discharging circuit provided by Embodiment 2 of the present application. This embodiment includes an inverter module on the basis of the Embodiment 1, and is suitable for uninterrupted charging and discharging of batteries. It includes a battery module 1, a transformer circuit 2, a buck-boost circuit 3, a power grid end or user end 4 and an inverter circuit 5.

Figure 4:
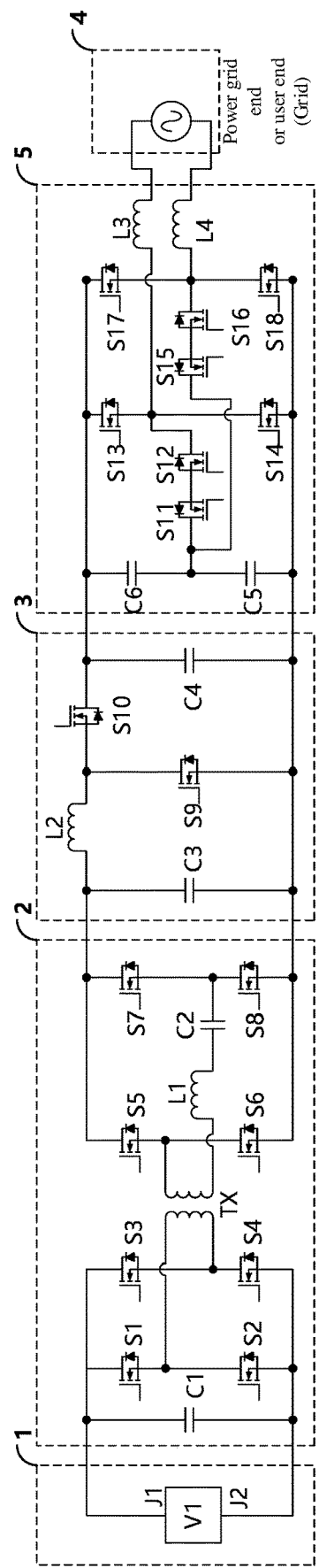
FIG. 4 is a circuit diagram of a battery charging and discharging circuit provided by Embodiment 2 of the present application.

Exemplarily, referring to FIG. 4, a circuit diagram of a battery charging and discharging circuit provided by this embodiment. The battery module 1 is configured to receive charging voltage or release discharging voltage. The battery module 1 includes a battery V1, the battery V1 includes a first interface J1 and a second interface J2.

The transformer circuit 2 is connected with the battery module 1, and configured to convert a first charging voltage into a charging voltage or convert a discharging voltage into a first discharging voltage; The transformer circuit 2 includes a transistor S1, a transistor S2, a transistor S3, a transistor S4, a transistor S5, a transistor S6, a transistor S7, a transistor S8, a transformer TX, an inductor L1, a capacitor C1 and a capacitor C2.

A first end of the capacitor C1 is connected to the battery module 1;
a second end of the capacitor C1 is connected to the battery module 1;
a first end of the transistor S1 is connected to the first end of the capacitor C1;
a second end of the transistor S1 is connected to the first end of the transistor S2;
a second end of the transistor S2 is connected to the second end of the capacitor C1;
a first end of the transistor S3 is connected to the first end of the transistor S1;
a second end of the transistor S3 is connected to a first end of the transistor S4;
a second end of the transistor S4 is connected to the second end of the transistor S2;
a first end of the transistor S5 is connected to a first end of the transistor S7;
a second end of the transistor S5 is connected to a first end of the transistor S6;
a second end of the transistor S6 is connected to a second end of the transistor S8;
a second end of the transistor S7 is connected to a first end of the transistor S8;
a first end of a primary side of the transformer TX is connected to the second end of the transistor S1;
a second end of the primary side of the transformer TX is connected to the first end of the transistor S4;
a first end of a secondary side of the transformer TX is connected to the second end of the transistor S5;
a second end of the secondary side of the transformer TX is connected to a first end of the inductor L1;
a second end of the inductor L1 is connected to a first end of the capacitor C2; and
a second end of the capacitor C2 is connected to the second end of the transistor S7.

The buck-boost circuit 3 is connected with the transformer circuit 2, and configured to convert a second charging voltage into the first charging voltage or convert the first discharging voltage into a second discharging voltage. The buck-boost circuit 3 includes: an inductor L2, a transistor S9, a transistor S10, a capacitor C3 and a capacitor C4.

A first end of the capacitor C3 is connected to a first end of the transformer circuit 2;
a second end of the capacitor C3 is connected to a second end of the transformer circuit 2;
a first end of the inductor L2 is connected to the first end of the capacitor C3;
a second end of the inductor L2 is connected to a first end of the transistor S9;
a second end of the transistor S9 is connected to the second end of the capacitor C3;
a first end of the transistor S10 is connected to the second end of the inductor L2;
a second end of the transistor S10 is connected to a first end of the capacitor C4; and
a second end of the capacitor C4 is connected to the second end of the transistor S9.

A power grid end or user end 4 is connected with the buck-boost circuit 3. And the power grid end or user end 4 is configured to generate the second charging voltage or receive the second discharging voltage.

In this embodiment, the second charging voltage is generated by the power grid end. When the power grid end supplies power normally, the battery V1 is in the charging mode, and the second charging voltage (360V) at the power grid end is decreased to the first charging voltage (300V) through the buck-boost circuit 3, then further decreased to the charging voltage (48V) through the transformer circuit 2, and then input to the battery V1 for charging. The discharge voltage is generated by the battery V1. When the power grid end can't supply power, the battery V1 is in the discharge mode. The discharge voltage (48V) is increased to the first discharge voltage (300V) through the transformer circuit 2, and then increased to the second discharge voltage (360V) through the buck-boost circuit 3, and then input to the user end for use.

the inverter circuit 5 is arranged between the transformer circuit 2 and the power grid end or user end 4, and is connected with the transformer circuit 2 and the power grid end or user end 4; the inverter circuit 5 is configured to convert the second charging voltage into a DC voltage or convert the second discharging voltage into an AC voltage.

The inverter circuit 5 includes a transistor S11, a transistor S12, a transistor S13, a transistor S14, a transistor S15, a transistor S16, a transistor S17, a transistor S18, a capacitor C6, a capacitor C5, an inductor L3, and an inductor L4.

A first end of the capacitor C6 is connected to a first end of the buck-boost circuit 3;
- a second end of the capacitor C6 is connected to a first end of the capacitor C5;
- a second end of the capacitor C5 is connected to a second end of the buck-boost circuit 3;
- a first end of the transistor S11 is connected to the second end of the capacitor C6;
- a second end of the transistor S11 is connected to a first end of the transistor S12;
- a second end of the transistor S12 is connected to a first end of the inductor L3;
- a second end of the inductor L3 is connected to the power grid end or user end 4;
- a first end of the transistor S15 is connected to the second end of the capacitor C6;
- a second end of the transistor S15 is connected to a first end of the transistor S16;
- a second end of the transistor S16 is connected to a first end of the inductor L4;
- a second end of the inductor L4 is connected to the power grid end or user end 4;
- a first end of the transistor S13 is connected to the first end of the capacitor C6;
- a second end of the transistor S13 is connected to a first end of the transistor S14;
- a second end of the transistor S14 is connected to the second end of the capacitor C5;
- a first end of the transistor S17 is connected to the first end of the capacitor C6;
- a second end of the transistor S17 is connected to a first end of the transistor S18; and
- a second end of the transistor S18 is connected to the second end of the capacitor C5.

In this embodiment, the inverter circuit 5 is an AC/DC conversion circuit, the power grid end or user end 4 generally adopts AC, while the battery charging and discharging is DC, in this case the inverter circuit 5 is required to perform AC/DC conversion. The second charging voltage is generated by the power grid end. When the power grid end supplies power normally, the battery V1 is in the charging mode. The second charging voltage (360V) at the power grid end is converted from AC to DC by the inverter circuit 5, and decreased to the first charging voltage (300V) through the buck-boost circuit 3, then further decreased to the charging voltage (48V) through the transformer circuit 2, and then input to the battery V1 for charging. The discharge voltage is generated by the battery V1. When the power grid end can't supply power, the battery V1 is in the discharge mode. The discharge voltage (48V) is increased to the first discharge voltage (300V) through the transformer circuit 2, and then increased to the second discharge voltage (360V) through the buck-boost circuit 3. After that, the inverter circuit 5 converts DC into AC and then the result is input to the user end for use.

The embodiment of the present application discloses a battery charging and discharging circuit, including: a battery module, configured to receive charging voltage or release discharging voltage; a transformer circuit, connected with the battery module, the transformer circuit is configured to convert a first charging voltage into a charging voltage or convert a discharging voltage into a first discharging voltage; a buck-boost circuit, connected with the transformer circuit, the buck-boost circuit is configured to convert a second charging voltage into the first charging voltage or convert the first discharging voltage into a second discharging voltage; a power grid end or user end, connected with the buck-boost circuit, the power grid end or user end is configured to generate the second charging voltage or receive the second discharging voltage; an inverter circuit, arranged between the transformer circuit and the power grid end or user end, and is connected with the transformer circuit and the power grid end or user end; the inverter circuit is configured to convert the second charging voltage into a DC voltage or convert the second discharging voltage into an AC voltage. According to the battery charging and discharging circuit provided by the embodiment of the present application, the battery is charged when there is commercial power at the power grid end, and the battery supplies power to important loads at the user end when the power grid end is cut off, so that the effect of uninterrupted charging and discharging is achieved, and the electricity safety of users is realized.

What is claimed is:

1. A battery charging and discharging circuit, comprising:
   - a battery module (1), configured to receive charging voltage or release discharging voltage;
   - a transformer circuit (2), connected with the battery module (1), the transformer circuit (2) is configured to convert a first charging voltage into a charging voltage or convert a discharging voltage into a first discharging voltage;
   - a buck-boost circuit (3), connected with the transformer circuit (2), the buck-boost circuit (3) is configured to convert a second charging voltage into the first charging voltage or convert the first discharging voltage into a second discharging voltage;
   - a power grid end or user end (4), connected with the buck-boost circuit (3), the power grid end or user end (4) is configured to generate the second charging voltage or receive the second discharging voltage;
   - the buck-boost circuit (3) comprises: a second inductor (L2), a ninth transistor (S9), a tenth transistor (S10), a third capacitor (C3) and a fourth capacitor (C4);
   - a first end of the third capacitor (C3) is connected to a first end of the transformer circuit (2);
   - a second end of the third capacitor (C3) is connected to a second end of the transformer circuit (2);
   - a first end of the second inductor (L2) is connected to the first end of the third capacitor (C3);
   - a second end of the second inductor (L2) is connected to a first end of the ninth transistor (S9);
   - a second end of the ninth transistor (S9) is connected to the second end of the third capacitor (C3);
   - a first end of the tenth transistor (S10) is connected to the second end of the second inductor (L2);
   - a second end of the tenth transistor (S10) is connected to a first end of the fourth capacitor (C4); and
   - a second end of the fourth capacitor (C4) is connected to the second end of the ninth transistor (S9).

2. The circuit of claim 1, wherein the battery module (1) comprises a battery (V1), the battery (V1) comprises a first interface (J1) and a second interface (J2).

3. The circuit of claim 2, wherein the battery (V1) is a lithium battery.

4. The circuit of claim 1, wherein the transformer circuit (2) comprises: a first transistor (S1), a second transistor (S2), a third transistor (S3), a fourth transistor (S4), a fifth transistor (S5), a sixth transistor (S6), a seventh transistor (S7), an eighth transistor (S8), a transformer (TX), a first inductor (L1), a first capacitor (C1) and a second capacitor (C2).

5. The circuit of claim 4, wherein a first end of the first capacitor (C1) is connected to the battery module (1);
   a second end of the first capacitor (C1) is connected to the battery module (1);
   a first end of the first transistor (S1) is connected to the first end of the first capacitor (C1);
   a second end of the first transistor (S1) is connected to the first end of the second transistor (S2);
   a second end of the second transistor (S2) is connected to the second end of the first capacitor (C1);
   a first end of the third transistor (S3) is connected to the first end of the first transistor (S1);
   a second end of the third transistor (S3) is connected to a first end of the fourth transistor (S4);
   a second end of the fourth transistor (S4) is connected to the second end of the second transistor (S2);
   a first end of the fifth transistor (S5) is connected to a first end of the seventh transistor (S7);
   a second end of the fifth transistor (S5) is connected to a first end of the sixth transistor (S6);
   a second end of the sixth transistor (S6) is connected to a second end of the eighth transistor (S8);
   a second end of the seventh transistor (S7) is connected to a first end of the eighth transistor (S8);
   a first end of a primary side of the transformer (TX) is connected to the second end of the first transistor (S1);
   a second end of the primary side of the transformer (TX) is connected to the first end of the fourth transistor (S4);
   a first end of a secondary side of the transformer (TX) is connected to the second end of the fifth transistor (S5);
   a second end of the secondary side of the transformer (TX) is connected to a first end of the first inductor (L1);
   a second end of the first inductor (L1) is connected to a first end of the second capacitor (C2); and
   a second end of the second capacitor (C2) is connected to the second end of the seventh transistor (S7).

6. The circuit of claim 1, further comprising an inverter circuit (5), the inverter circuit (5) is arranged between the transformer circuit (2) and the power grid end or user end (4), and is connected with the transformer circuit (2) and the power grid end or user end (4); the inverter circuit (5) is configured to convert the second charging voltage into a DC voltage or convert the second discharging voltage into an AC voltage.

7. The circuit of claim 6, wherein the inverter circuit (5) comprise: an eleventh transistor (S11), a twelfth transistor (S12), a thirteenth transistor (S13), a fourteenth transistor (S14), a fifteenth transistor (S15), a sixteenth transistor (S16), a seventeenth transistor (S17), an eighteenth transistor (S18), a fifth capacitor (C5), a sixth capacitor (C6), a third inductor (L3) and a fourth inductor (L4).

8. The circuit of claim 7, wherein a first end of the sixth capacitor (C6) is connected to a first end of the buck-boost circuit (3);
   a second end of the sixth capacitor (C6) is connected to a first end of the fifth capacitor (C5);
   a second end of the fifth capacitor (C5) is connected to a second end of the buck-boost circuit (3);
   a first end of the eleventh transistor (S11) is connected to the second end of the sixth capacitor (C6);
   a second end of the eleventh transistor (S11) is connected to a first end of the twelfth transistor (S12);
   a second end of the twelfth transistor (S12) is connected to a first end of the third inductor (L3);
   a second end of the third inductor (L3) is connected to the power grid end or user end (4);
   a first end of the fifteenth transistor (S15) is connected to the second end of the sixth capacitor (C6);
   a second end of the fifteenth transistor (S15) is connected to a first end of the sixteenth transistor (S16);
   a second end of the sixteenth transistor (S16) is connected to a first end of the fourth inductor (L4);
   a second end of the fourth inductor (L4) is connected to the power grid end or user end (4);
   a first end of the thirteenth transistor (S13) is connected to the first end of the sixth capacitor (C6);
   a second end of the thirteenth transistor (S13) is connected to a first end of the fourteenth transistor (S14);
   a second end of the fourteenth transistor (S14) is connected to the second end of the fifth capacitor (C5);
   a first end of the seventeenth transistor (S17) is connected to the first end of the sixth capacitor (C6);
   a second end of the seventeenth transistor (S17) is connected to a first end of the eighteenth transistor (S18); and
   a second end of the eighteenth transistor (S18) is connected to the second end of the fifth capacitor (C5).

* * * * *